S. D. Tillman,

Fire Tube Boiler.

No. 104,511.   Patented June 21, 1870.

Witnesses.   Inventor.

United States Patent Office.

SAMUEL D. TILLMAN, OF JERSEY CITY, NEW JERSEY.

*Letters Patent No. 104,511, dated June 21, 1870.*

STEAM-GENERATOR.

The Schedule referred to in these Letters Patent and making part of the same

*To all whom it may concern:*

Be it known that I, SAMUEL D. TILLMAN, of Jersey City, in the county of Hudson and State of New Jersey, have invented certain new and useful Improvements in Steam-Boilers; and I do hereby declare that the following is a full and exact description thereof.

I will first describe what I consider the best means of carrying out my invention, and will afterward designate the points which I believe to be new therein.

The accompanying drawing forms a part of this specification.

Figure 1:
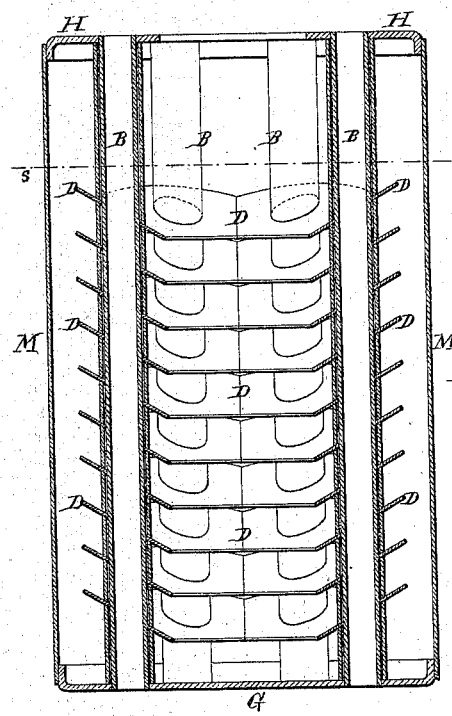
Figure 1 is a cross-section.
Figure 2:
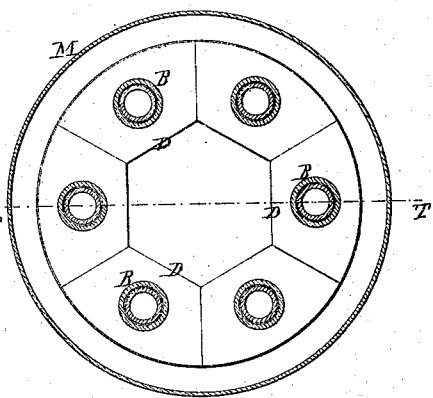
Figure 2 is another, the first being on the line T T, fig. 2, and the second on the line S S, fig. 1.

The additional figures are only of importance in illustrating modifications of portions of my apparatus.

Similar letters of reference indicate corresponding parts in both the figures.

The drawing represents the novel parts, with so much of the ordinary parts as seems necessary to indicate their relation thereto.

G is a stout plate of iron, forming the bottom of my boiler, and

H is a corresponding plate forming the top thereof.

M is a cylindrical shell, which joins the bottom G with the top H, and forms, with the said top and bottom, an upright cylindrical boiler-shell, having the strength and other qualities necessary to resist the pressure of the steam.

B B, &c., are tubes, extending longitudinally through the boiler, and set in the upper and lower ends in the ordinary or any suitable manner, to allow a portion of the products of combustion to pass through these tubes and impart their heat to the water.

The tubes B are arranged in a circle or series. I have represented six, but the number may be increased or diminished without losing all the advantages of my invention. It is important that they be arranged in a circular series, each at a proper distance both from the center and the circumference of the cylinder, as will presently appear.

D D are plates of wrought iron, or other suitable material, mounted on the tubes B, and standing obliquely across, as represented. They may be secured in any ordinary or approved manner, as, for example, welding, brazing, or soldering, and they may be formed of such size, and so arranged as to match each other edge to edge, that is to say, the edges of the plates D on one pipe, B, may coincide with the edge of the plates D on the adjacent tubes B, but this condition is not absolutely essential to the success of my invention.

Figure 5:
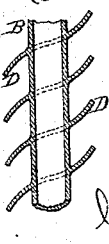

The degree of inclination of my plates D may be varied. Instead of making them absolutely plane, they may be curved, as indicated in Figure 5, or they may be curved in the other direction, so that a series of plates extending horizontally around in the interior of the boiler, coinciding at their edges, as represented, may present the contour of a segment of a cone, instead of the segment of a pyramid, which latter form will result from the use of plane plates.

Various other variations may be made by any good mechanic, without departing from the principle or destroying the beneficial effect of my invention.

When my boiler is set in brick-work, I leave a little space, say one inch, more or less, between the exterior of the cylindrical surface M and the interior of the brick-work. The boiler having been filled with water to a proper extent, and provided with suitable connections for the discharge of the steam, and for supplying feed-water, as will be obvious, a fire is maintained below on any ordinary and suitable grate, and a portion of the draught is allowed to flow upward through the pipes B, while another portion is allowed to rise in the narrow annular space around the exterior.

Under these or any analogous conditions my plates D perform important functions, both by increasing the heating-surface and deflecting the currents of water and steam. As tubes in upright boilers have been heretofore generally arranged, the steam produced on the lower portion of any tube rises in contact with the tube and partially or entirely prevents the access of the dense water to the upper portion of the tube.

In my improved boiler, the particles of steam generated below any given plate D rises directly, dragging the surrounding water with them, until they strike the said plate, and are thereby deflected outward, while dense water from near the axial line of the boiler flows outward, to take the place of the water so removed to become, in its turn, partially changed into steam, and rise and move outward.

When, as above provided, cylindrical shell M is also a heating-surface, the steam generated on its inner surface also rising, generates an active upward current around the entire circumference of the boiler.

On reaching the water surface, the particles of steam are liberated, a current of water flows inward from all sides, and descends in the center of the boiler. In its descent it supplies the several spaces between the plates D with an outgoing current of water, and thus an active round or circulation obtains.

One new result obtained by my tubes, covered with a series of projections or plates, D, is that steam will be generated faster than by plain tubes, through which the hot products of combustion are passing. The temperature of my tubes cannot be raised to such a point that steam will not be generated freely, since the outside transverse plates or projections are rapidly conducting the heat from the tube itself and preventing its being overheated.

It seems now to be well settled that steam is generated most rapidly at a degree of temperature far below that at which water assumes the spheroidal condition. The best temperature for generating steam under the pressure of one atmosphere is probably not far from 400° to 500° Fahrenheit, and as the pressure is increased, it will be necessary to increase the temperature of the tubes.

To prevent the bottom G from overheating, it may be covered with radial projections, which would not seriously retard the circulation of the descending water, but it is most feasible and economical to place a non-conducting substance, like soapstone, under the bottom, having in it holes corresponding with the lower ends of the tubes, so as to allow the heat to pass into the tubes.

I propose, in some cases, to use one of these tubes B, with its plates, D, mounted centrally in a larger tube, a series of which larger tubes properly constructed shall form a boiler; and in some cases the attached plates or projections on the tubes may form crescent-shaped opening above and below, and the whole may be cast together. This will increase its strength.

Figure 3:
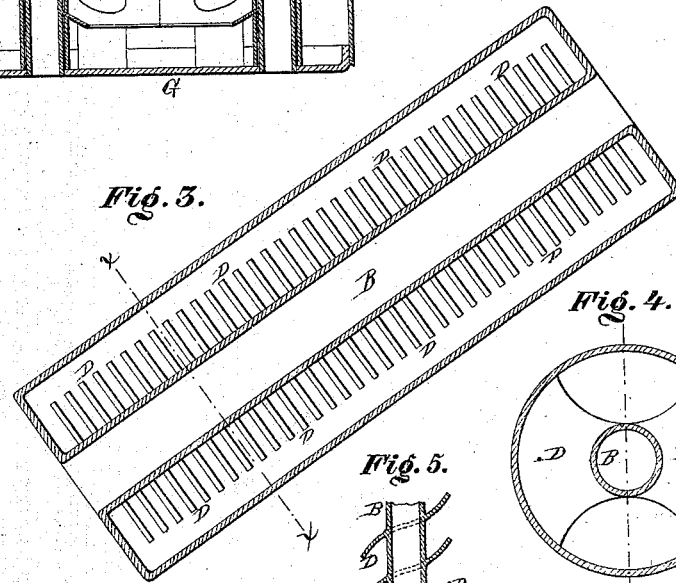

Figure 3 represents such a cast-iron section, having an inclined position, and

Figure 4:
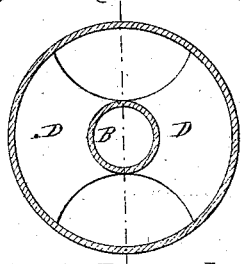

Figure 4, a cross-section on line $x$–$x$ in fig. 3, showing how the water passes under the central tube and the steam above it.

The plates D D may also be used on horizontal tubes in a horizontal boiler, for the purpose of increasing the heating-surface, in which case the plates are perpendicular to the tube, and the tubes are so arranged as not to be in the same vertical line.

I propose, under some circumstances, to modify the provision for presenting the products of combustion in my boiler, by leading the whole up through the tubes B, and then leading down the partially-cooled gases, either spirally or in any other suitable manner around the exterior of the shell M.

With any arrangement for presenting the hot gases to the exterior of the shell, the advantage of the circular arrangement of the pipes B and of the inclination of the several plates D, rising from the center outward in all directions, is obvious, because the current of rising steam and water, induced by the heating effect of the several pipes B, is, by such arrangement, combined with the heating effect of the shell.

In case no heat is applied to the exterior M, the plates D may be inclined in the opposite direction, and the current of mingled steam and water may rise through the central space, assisted or not by the heat of a tube or flue in the center, which should have none of my cross-plates D. With that arrangement, the dense water will flow down between the exteriors of the plates D and the interior of the shell M. For stationary boilers, I much prefer the arrangement represented.

I am aware that many devices have been before proposed for variously promoting the circulation of water in boilers, and for increasing the conducting or connecting surface; but I am not aware of any previous construction or arrangement similar, or, in its effects, equal to mine. I can make my pipes very effectually by properly coring, of cast-iron, and, in such cases, propose to make the plates D in one piece, with the tubes B, to which they belong. I can provide two or more series of tubes B, with their plates D, when the boiler is of sufficient size to require them, in which case the plates D will be inclined in opposite directions on the two sets of tubes.

I esteem it an important advantage of my invention that it abstracts the heat from the gaseous contents of the tubes with more than usual effect. This is due both to the presentation of the water in a dense state and in very active currents, and also to the conducting effect of the plates D, and I believe it preferable, under most circumstances, to make the tubes B in a single series, and of such size as may be required to carry a large proportion of the draught of the furnace.

I have referred to the interposition of soap-stone to defend the lower plate G, and have represented the tubes as double, or as enveloped each with a broad inclined thimble between each plate D, and the next above or below. Such would form a convenient mode of holding the plates D, if not joined by solder, or the like, to the inner and main tubes B with sufficient force; but these provisions for reducing the transmission of heat may be objectionable where much steam is to be made in a small boiler, and can be entirely dispensed with without affecting the objects of my invention in any weakening or damaging degree.

I claim the within-described steam-boiler, composed of the pipes B, cross-plates D, and boiler-shell G H M, combined and arranged to serve relatively to each other and to the fluids circulating therein, substantially as herein set forth.

In testimony whereof I have hereunto set my name in presence of two subscribing witnesses.

SAML. D. TILLMAN.

Witnesses:
 W. C. DEY,
 C. C. LIVINGS.